Nov. 5, 1935.        J. H. MELVIN        2,020,153
ANIMAL TRAP
Filed Sept. 17, 1934
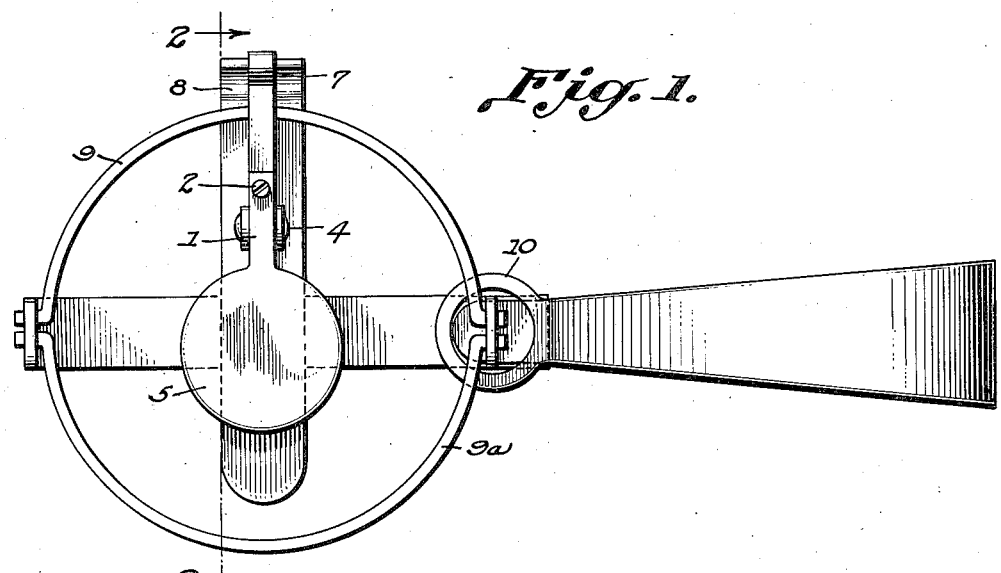
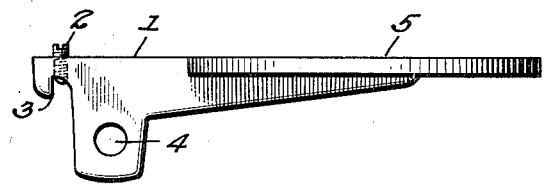 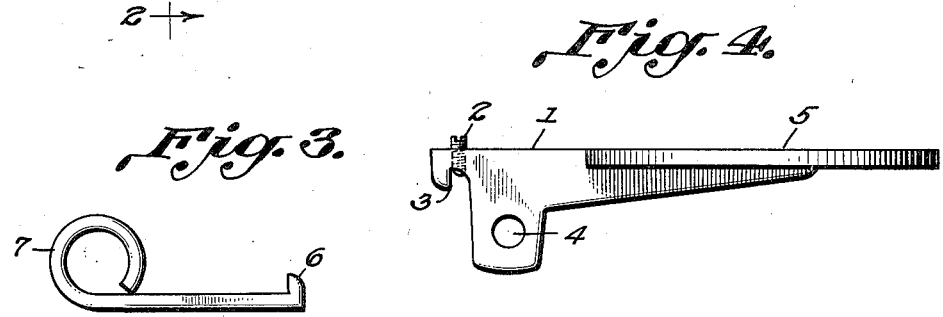
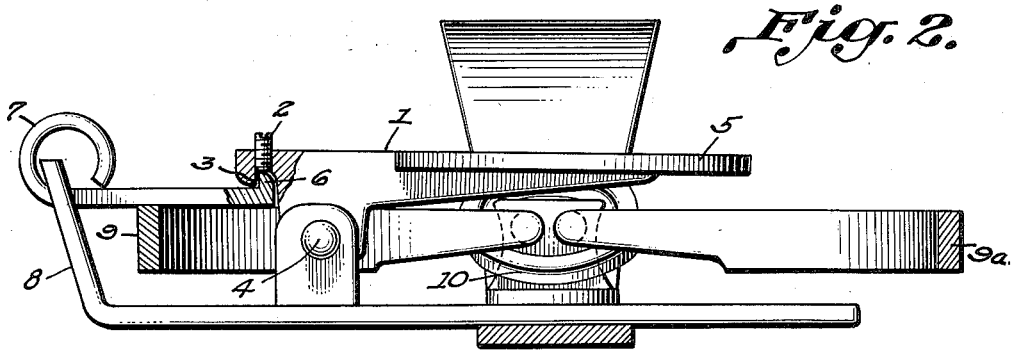
Inventor:
John H. Melvin Patented Nov. 5, 1935

2,020,153

UNITED STATES PATENT OFFICE 2,020,153

ANIMAL TRAP

John H. Melvin, Westby, Mont.

Application September 17, 1934, Serial No. 744,309

1 Claim. (Cl. 43—92)

The invention relates to improvements in animal traps in which a new type of pan-shank and dog is used; the purpose of which is to enable the trapper to regulate his traps so that the set traps will snap at any desired pressure on the trap pan, depending upon the size of trap used and the animal to be trapped. The main purpose of the invention is to eliminate the possibility of small birds and animals, such as pheasants, magpies, hawks, crows, gophers, prairie dogs, and rabbits being caught in traps which have been set for fox, badger, wolf, mountain lion, or bear.

Figure 1 is a plan view of the trap in set position. Figure 2 is a transverse section of the trap taken of line 2—2 of Figure 1. Figure 3 is a side elevation of the trap dog. Figure 4 is a side elevation of the trap pan and shank.

In Figure 2, number 1 is the pan-shank; 2 is a headless slotted-end regulating screw made of rust-proof material; 3 is the dog-notch on the under side of the pan-shank; 4 is the rivet hole in the pan-shank, whereby it is fastened to the trap; 5 is the trap pan.

Figure 3 shows the trap dog; 6 is the vertical end or catch which fits into dog-notch, 3, on the pan-shank; 7 is the looped end of trap dog which fits into slot in trap frame, 8.

Figure 2 is a transverse sectional view of a set trap with the elements shown in Figure 3 and Figure 4 in position, with the vertical end, 6 of Figure 2, engaged in dog-notch, 3, of the pan-shank; the looped end, 7, of the trap dog is engaged in trap frame, 8; the trap jaws, 9 and 9a, are held up by the tension of trap spring, 10, thereby holding the trap dog up in dog-notch, 3, of the pan-shank. As shown in Figure 3, regulating screw, 2, can be screwed up or down as desired to regulate the trap to snap at any desired pressure on the trap pan.

I claim:

In a trap of the class described having a base, a pair of jaws pivotally mounted on said base, a spring for tensioning the jaws and means adapted to hold the trap in open position, said means comprising a treadle plate including a shank pivoted intermediate its ends to the base and having a notch on the under side of the shank, a threaded hole communicating with said notch, a screw mounted in said hole and adapted upon rotation to vary the depth of the notch, and a keeper pivoted to the base and adapted to overlie one of the jaw members when in the set position, said keeper having an angularly bent end for insertion in the notch portion of the treadle.

JOHN H. MELVIN.